United States Patent
Fujimoto

(10) Patent No.: US 9,977,720 B2
(45) Date of Patent: May 22, 2018

(54) METHOD, INFORMATION PROCESSING APPARATUS, AND COMPUTER READABLE MEDIUM

(71) Applicant: FUJITSU LIMITED, Kawasaki-shi, Kanagawa (JP)

(72) Inventor: Koki Fujimoto, Koga (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/064,747

(22) Filed: Mar. 9, 2016

(65) Prior Publication Data
US 2016/0266985 A1 Sep. 15, 2016

(30) Foreign Application Priority Data
Mar. 11, 2015 (JP) .................... 2015-048630

(51) Int. Cl.
  G06F 11/00 (2006.01)
  G06F 11/18 (2006.01)
  G06F 11/16 (2006.01)
(52) U.S. Cl.
  CPC ........ G06F 11/184 (2013.01); G06F 11/1695 (2013.01)
(58) Field of Classification Search
  USPC .......................................................... 714/11
  See application file for complete search history.

(56) References Cited

U.S. PATENT DOCUMENTS

2003/0131291 A1* 7/2003 Morrison ................ H04L 63/12
  714/54
2006/0242461 A1* 10/2006 Kondo .................. G06F 9/3824
  714/21
2013/0339788 A1* 12/2013 Gale .................... G06F 11/1679
  714/16

FOREIGN PATENT DOCUMENTS

| JP | 5-341803 | 12/1993 |
| JP | 2002-149212 | 5/2002 |
| JP | 2005-258947 | 9/2005 |
| JP | 2008-305076 | 12/2008 |
| JP | 2013-239034 | 11/2013 |

\* cited by examiner

*Primary Examiner* — Sarai E Butler
(74) *Attorney, Agent, or Firm* — Oblon, McClelland, Maier & Neustadt, L.L.P.

(57) ABSTRACT

A method includes: causing at least three processors to perform a same process; extracting, when one of the at least three processors outputs different operational information generated by performing the same process, majority processors with which outputted operational information are the same and a minority processor with which different operational information is outputted; and controlling one of the two redundant processors to output a result of the same process.

17 Claims, 14 Drawing Sheets

FIG. 10

| NUMBER OF CPU | OPERATION | WORKING | FAILURE | PRIORITY ORDER OF SWITCHING |
|---|---|---|---|---|
| 1 | 1 | 1 | 0 | 0 |
| 2 | 0 | 1 | 0 | 1 |
| 3 | 0 | 1 | 0 | 2 |
| 4 | 0 | 0 | 0 | 3 |
| 5 | 0 | 0 | 0 | 4 |
| ⋮ | ⋮ | ⋮ | ⋮ | ⋮ |
| n | 0 | 0 | 0 | n-1 |

FIG. 11

| NUMBER OF CPU | OPERATION | WORKING | FAILURE | PRIORITY ORDER OF SWITCHING |
|---|---|---|---|---|
| 1 | 0 | 0 | 1 | 0 |
| 2 | 1 | 1 | 0 | 0 |
| 3 | 0 | 1 | 0 | 1 |
| 4 | 0 | 1 | 0 | 2 |
| 5 | 0 | 0 | 0 | 3 |
| ⋮ | ⋮ | ⋮ | ⋮ | ⋮ |
| n | 0 | 0 | 0 | n-2 |

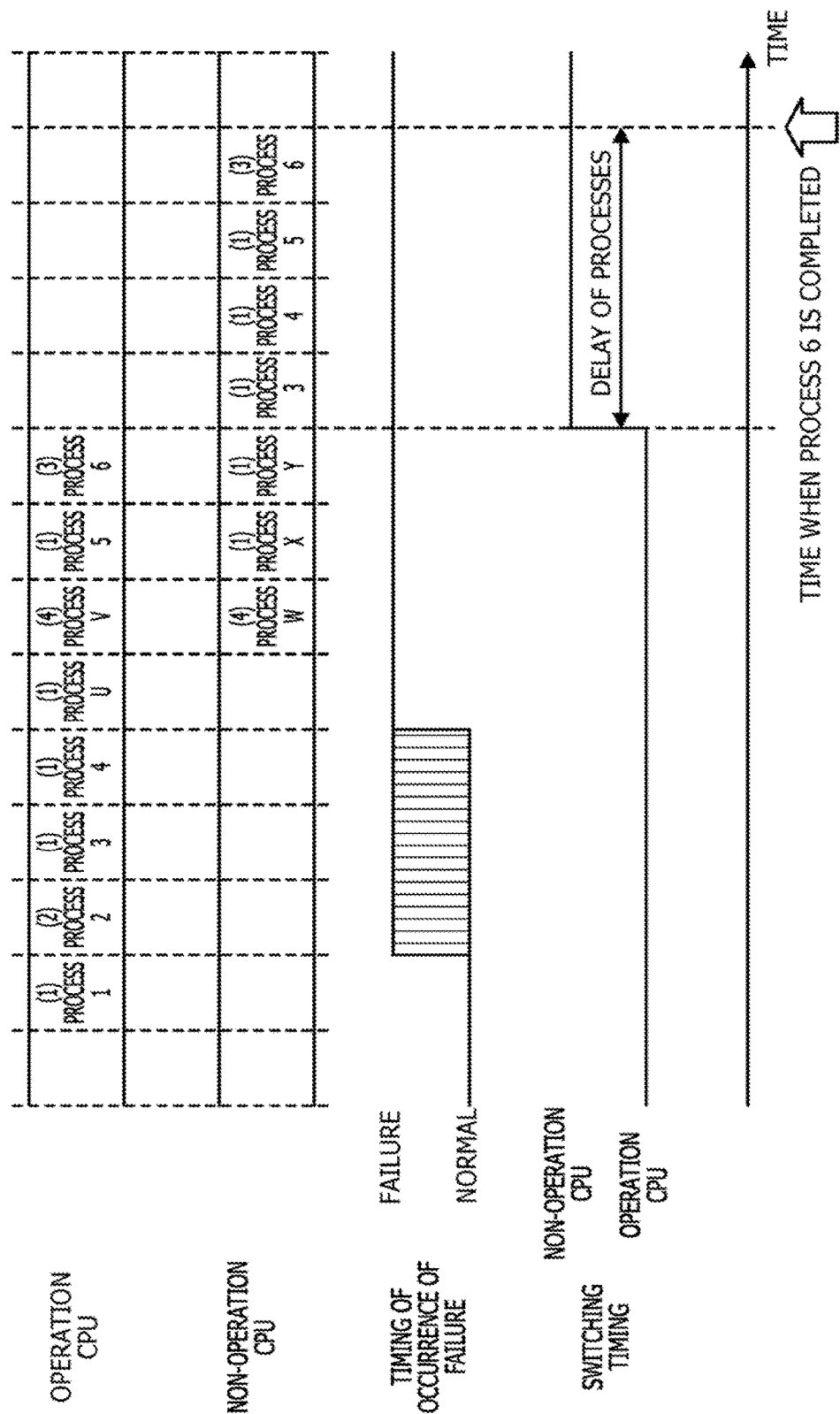

METHOD, INFORMATION PROCESSING APPARATUS, AND COMPUTER READABLE MEDIUM

CROSS-REFERENCE TO RELATED APPLICATION

This application is based upon and claims the benefit of priority of the prior Japanese Patent Application No. 2015-048630, filed on Mar. 11, 2015, the entire contents of which are incorporated herein by reference.

FIELD

The embodiments discussed herein are related to a redundancy technology.

BACKGROUND

Availability means resistance to failure. In particular, in computer systems in which instantaneous interruption is not permitted, such as computer systems used in plant control and aircraft control, various measures are taken in order to improve the availability of the computer systems for continuous operation.

Technologies to make processors or servers redundant are known as the technologies to improve the availability of the computer systems. For example, the following technology is disclosed in a certain document. Specifically, each arithmetic processing unit determines the state of the own arithmetic processing unit using arithmetic operations and transmits state data indicating the state of the own arithmetic processing unit to multiple determination units on a certain cycle. Each of the determination units selects normal arithmetic processing units based on the state data and notifies a control unit of the result of the selection. The control unit extracts a normal arithmetic processing unit from the result of the selection received from each determination unit based on a majority rule.

In this technology, each arithmetic processing unit determines the state of the own arithmetic processing unit, each determination unit selects the normal arithmetic processing units, and the control unit extracts the normal arithmetic processing unit based on the majority rule. Accordingly, it may take a time to finally extract the normal arithmetic processing unit and no consideration is taken for the time.

For example, an example of the related art is disclosed in Japanese Laid-open Patent Publication No. 2013-239034.

SUMMARY

According to an aspect of the invention, a method includes: causing, by a control circuitry, at least three processors to perform a same process; extracting, by the control circuitry, when one of the at least three processors outputs different operational information generated by performing the same process, majority processors with which outputted operational information are the same and a minority processor with which different operational information is outputted; and controlling, by the control circuitry, one of the two redundant processors to output a result of the same process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates exemplary data stored in a management table;

FIG. 11 illustrates other exemplary data stored in the management table;

FIG. 14 is a diagram for describing another switching time of the operation CPU.

DESCRIPTION OF EMBODIMENTS

According to embodiments, a normal processor is capable of being extracted from multiple processors that are working.

First Embodiment

Figure 1:
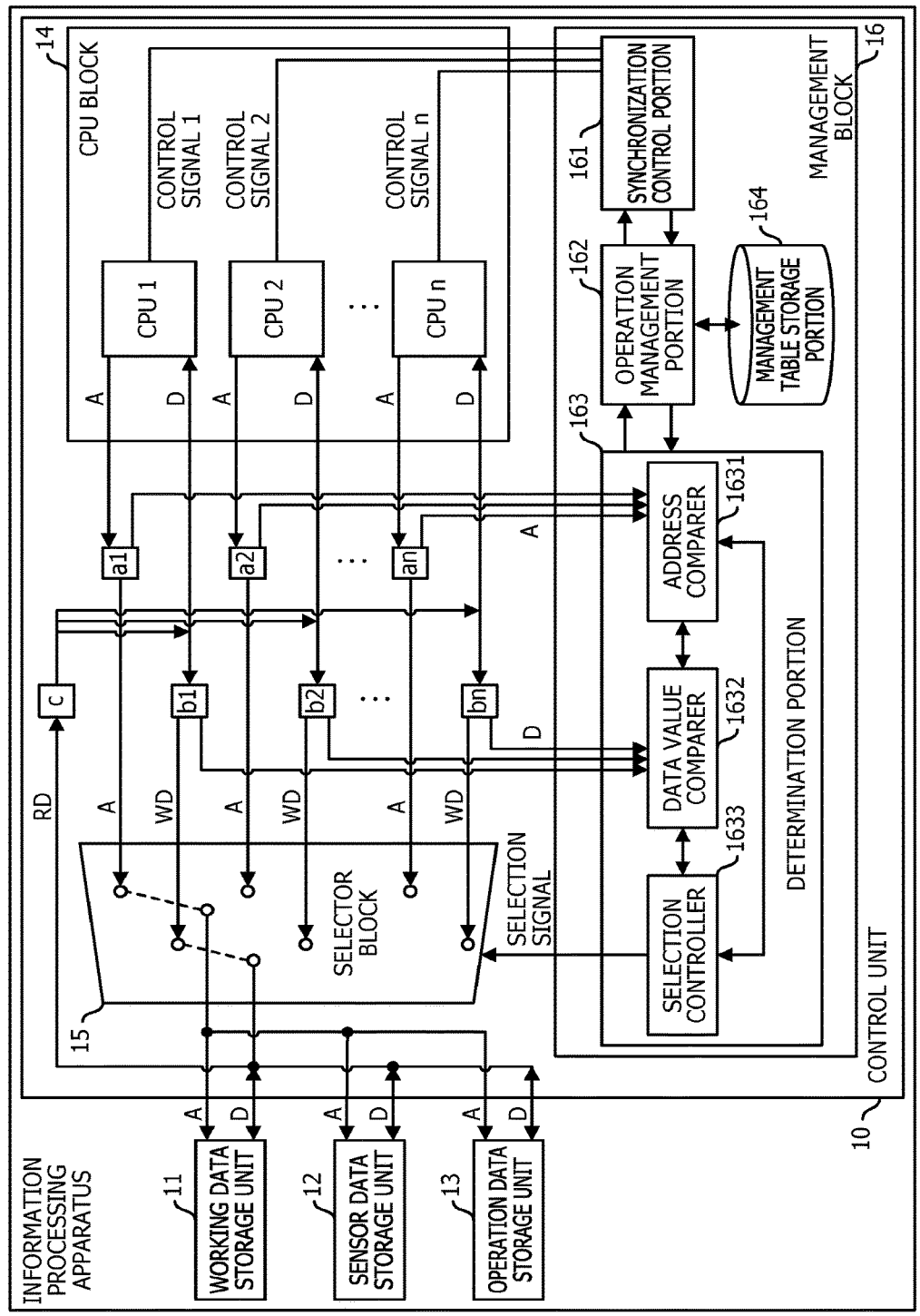
FIG. 1 illustrates an exemplary configuration of an information processing apparatus according to a first embodiment.

FIG. 1 illustrates an exemplary configuration of an information processing apparatus 1 according to a first embodiment. Referring to FIG. 1, the information processing apparatus 1 includes a control unit 10, a working data storage unit 11, a sensor data storage unit 12, and an operation data storage unit 13. The control unit 10 includes a central processing unit (CPU) block 14, a selector block 15, a management block 16, storages a1 to an (n is a natural number not smaller than three), storages b1 to bn, and a storage c. The CPU block 14 includes multiple CPUs: CPU 1 to CPU n. The management block 16 includes a synchronization control portion 161, an operation management portion 162, a determination portion 163, and a management table storage portion 164. The determination portion 163 includes an address comparer 1631, a data value comparer 1632, and a selection controller 1633.

Referring to FIG. 1, "WD" denotes a data value to be written, "RD" denotes a data value that is read out, "D" denotes a data value, and "A" denotes an address. A bus indicated with "D" is a data bus and a bus indicated with "A" is an address bus.

The working data storage unit 11 is, for example, a memory. The working data storage unit 11 is connected to the selector block 15 and the storage c. Programs executed by the CPU 1 to CPU n, data used by the CPU 1 to CPU n during the execution of the programs, and so on are stored in the working data storage unit 11.

The sensor data storage unit 12 is, for example, a memory or a register. The sensor data storage unit 12 is connected to the selector block 15 and the storage c. For example, data (hereinafter referred to as "sensor data") measured by a temperature sensor, an altitude sensor, or the like is stored in the sensor data storage unit 12.

The operation data storage unit 13 is, for example, a memory or a register. The operation data storage unit 13 is connected to the selector block 15 and the storage c. For example, commands are stored in the operation data storage unit 13.

The selector block 15 is connected to the working data storage unit 11, the sensor data storage unit 12, the operation data storage unit 13, the management block 16, the storages a1 to an, and the storages b1 to bn. The selector block 15 switches the CPU to be connected to the working data storage unit 11, the sensor data storage unit 12, and the operation data storage unit 13 in accordance with a CPU selection signal supplied from the selection controller 1633. In the example illustrated in FIG. 1, the CPU selected with the CPU selection signal is the CPU 1. The CPU selection signal is denoted by a "selection signal" in FIG. 1 for visibility.

The storages a1 to an are, for example, registers. Each of the storages a1 to an stores an address output from the corresponding CPU. The storages b1 to bn are, for example, registers. Each of the storages b1 to bn stores a data value (data value to be written) output from the corresponding CPU. The storage c is, for example, a register. The storage c stores the data value read out from the working data storage unit 11, the data value read out from the sensor data storage unit 12, and the data value read out from the operation data storage unit 13. The data values stored in the storage c is read out by the CPU 1 to CPU n. As described above, since the provision of the storage c causes the CPU 1 to CPU n to perform the subsequent processes based on the same values, the reliability of majority decision is improved.

The CPU 1 to CPU n are multiple CPUs that execute the same programs. Although the processes by the CPU 1 to CPU n are synchronized with each other and the processes are concurrently performed in parallel, the processes by non-operation CPUs may delayed from the processes by an operation CPU by a certain time. Part of the CPU 1 to CPU n may be stopped. The CPU that is working is referred to as a working CPU. The CPU that is not working and that is stopped is referred to as a non-working CPU. Among the working CPUs, the CPU connected to the working data storage unit 11, the sensor data storage unit 12, and the operation data storage unit 13 via the selector block 15 is referred to as an operation CPU. Among the working CPUs, the CPU that executes the same programs as those executed by the operation CPU but is not connected to the working data storage unit 11, the sensor data storage unit 12, and the operation data storage unit 13 is referred to as a non-operation CPU. In the first embodiment, among the working CPUs, one CPU is the operation CPU and the remaining CPUs are the non-operation CPUs.

Since the majority decision is available with at least three working CPUs, control may be performed so as to keep the number of the working CPUs to three to achieve power saving. It is sufficient for the number of the non-working CPUs to be zero or more.

The synchronization control portion 161 controls operation timing and working of the CPU 1 to CPU n in accordance with information on the operation status and information on the working status, which are received from the operation management portion 162, using synchronization control signals. The synchronization control portion 161 supplies information on the synchronization status to the operation management portion 162. Each of the synchronization control signal is, for example, a signal to clear resetting or a signal to delay a response of bus access. The synchronization control signals are denoted by "control signals" in FIG. 1 for visibility.

The operation management portion 162 manages data to be stored in the management table storage portion 164 based on the information on the synchronization status received from the synchronization control portion 161 and information on the selection status received from the determination portion 163. The operation management portion 162 supplies the information on the operation status and the information on the working status to the determination portion 163 and the synchronization control portion 161.

The address comparer 1631 copies the addresses stored in the storages a1 to an to acquire the copied addresses. The address comparer 1631 compares the acquired multiple addresses with each other and supplies the result of the comparison to the selection controller 1633.

The data value comparer 1632 copies the data values (data values to be written) stored in the storages b1 to bn to acquire the copied data values. The data value comparer 1632 compares the acquired multiple data values with each other and supplies the result of the comparison to the selection controller 1633.

The selection controller 1633 performs a process of selecting the operation CPU based on the result of the comparison received from the address comparer 1631, the result of the comparison received from the data value comparer 1632, and the information on the operation status and the information on the working status, which are received from the operation management portion 162. The selection controller 1633 changes the CPU selection signal to be supplied to the selector block 15 based on the result of the selection of the operation CPU.

An exemplary operation of the working CPUs and switching of the operation CPU in the first embodiment will now be described with reference to FIG. 2 to FIG. 4.

Figure 2:
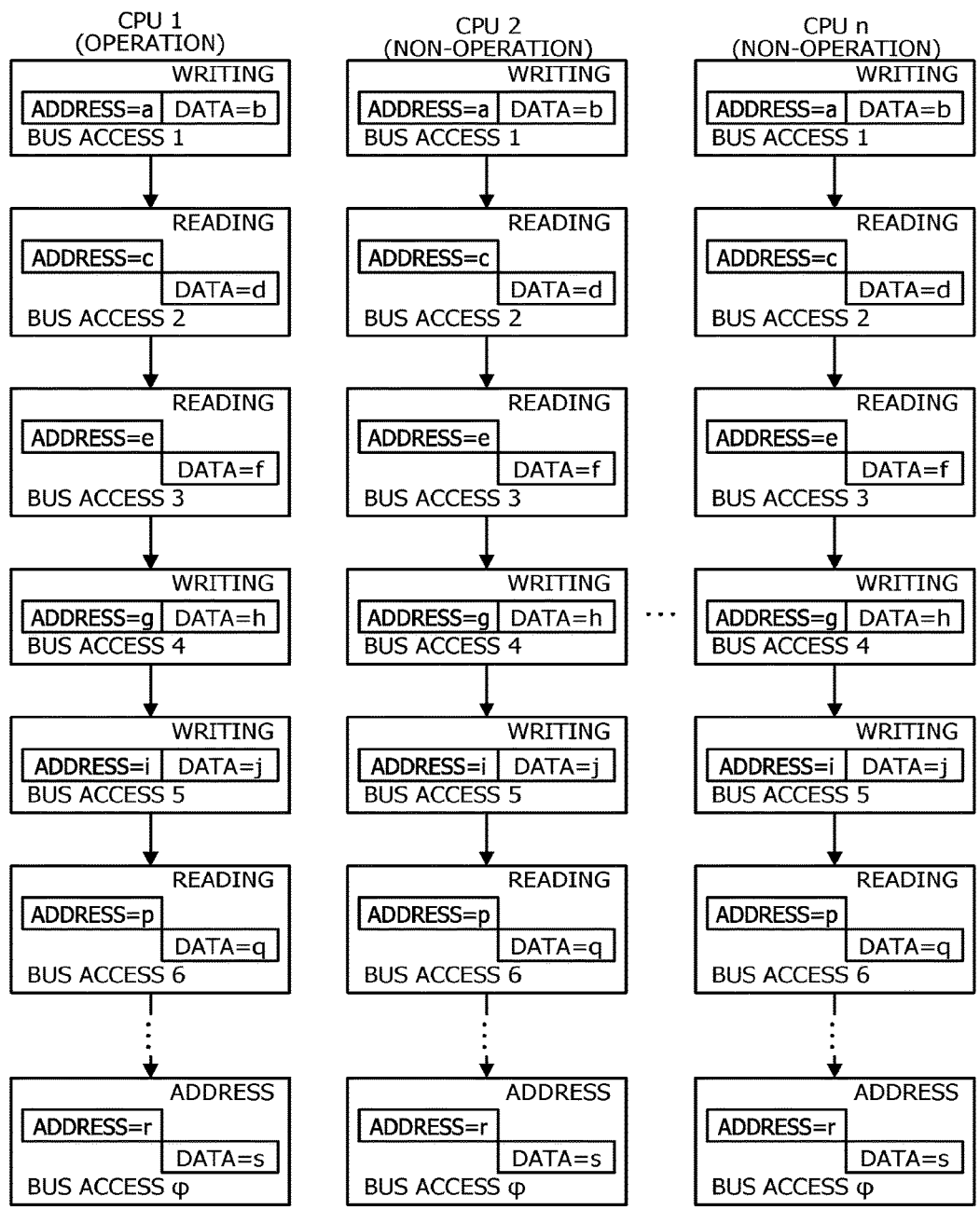
FIG. 2 is a diagram for describing an operation of working CPUs and how to switch an operation CPU.

In the example illustrated in FIG. 2, the CPU 1 to CPU n are the working CPUs. The CPU 1 is the operation CPU and the CPU 2 to CPU n are the non-operation CPUs. When the CPU 1 performs writing (bus access 1) in which address=a and data value=b, the CPU 2 to CPU n also perform the bus access 1. Similarly, when the CPU 1 performs reading (bus access 2) in which address=c and data value=d, the CPU 2 to CPU n also perform the bus access 2. The above operation is repeated.

In a phase in which the writing access is performed, it is determined whether any failure occurs in the CPUs based on the writing addresses stored in the storages a1 to an and the data values stored in the storages b1 to bn. For example, when the address of the CPU 3 is "gg" and the addresses of the other CPUs are "g" in a phase of a bus access 4, it is determined that a failure occurs in the CPU 3 because the CPU 3 is in a minority group. When the data value of the CPU 3 is "hh" and the data values of the other CPUs are "h" even if a difference in address is not detected, it is determined that a failure occurs in the CPU 3 because the CPU 3 is in the minority group. As described above, it is determined that a failure occurs in the CPU if a difference in address is detected or a difference in data value is detected.

In a phase in which the reading access is performed, no data value is output from the CPUs. Accordingly, it is determined whether any failure occurs in the CPUs based on the reading addresses stored in the storages a1 to an. For example, when the address of the CPU 3 is "cc" and the addresses of the other CPUs are "c" in a phase of the bus access 2, it is determined that a failure occurs in the CPU 3 because the CPU 3 is in the minority group.

Figure 3:
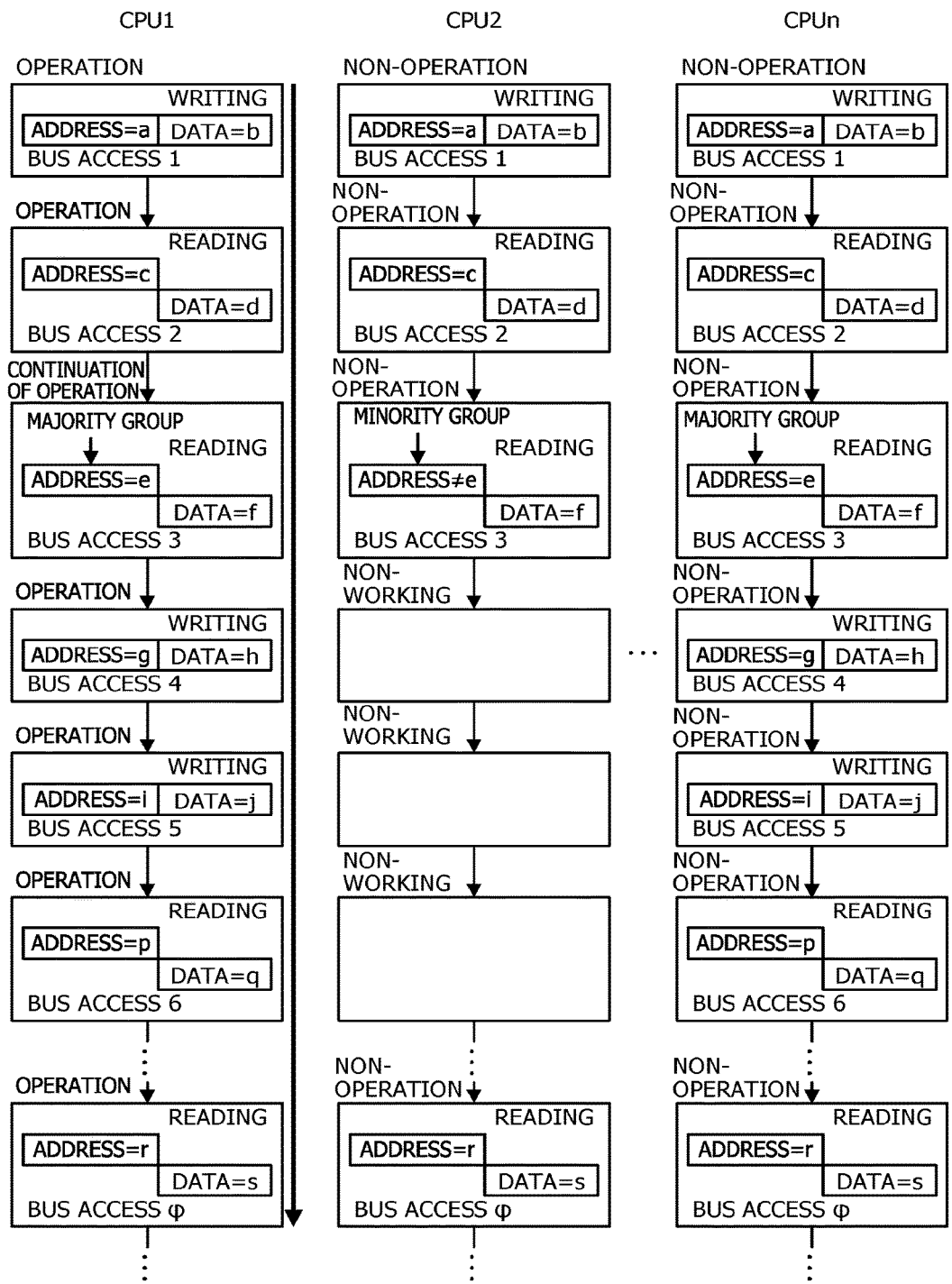
FIG. 3 is another diagram for describing the operation of the working CPUs and how to switch the operation CPU.

FIG. 3 illustrates an exemplary operation of the CPU 1 to CPU n when any failure occurs in the CPU 2 in a phase of a bus access 3. In the example in FIG. 3, the CPU 1 is the operation CPU and the CPUs other than the CPU 1 are the non-operation CPUs. It is assumed that the address of the CPU 2 is not "e" but the addresses of the CPUs other than the CPU 2 are "e". In such a case, it is determined that any failure occurs in the CPU 2 through the majority decision. However, since the CPU 2 is not the operation CPU, switching of the operation CPU is not performed and the CPU 1 is kept as the operation CPU. In the example in FIG. 3, the CPU 2 is stopped after the failure has occurred and is switched to the non-working CPU. The CPU 2 returns to the non-operation CPU from a phase of a bus access ϕ, for example, after the failure is cleared.

Figure 4:
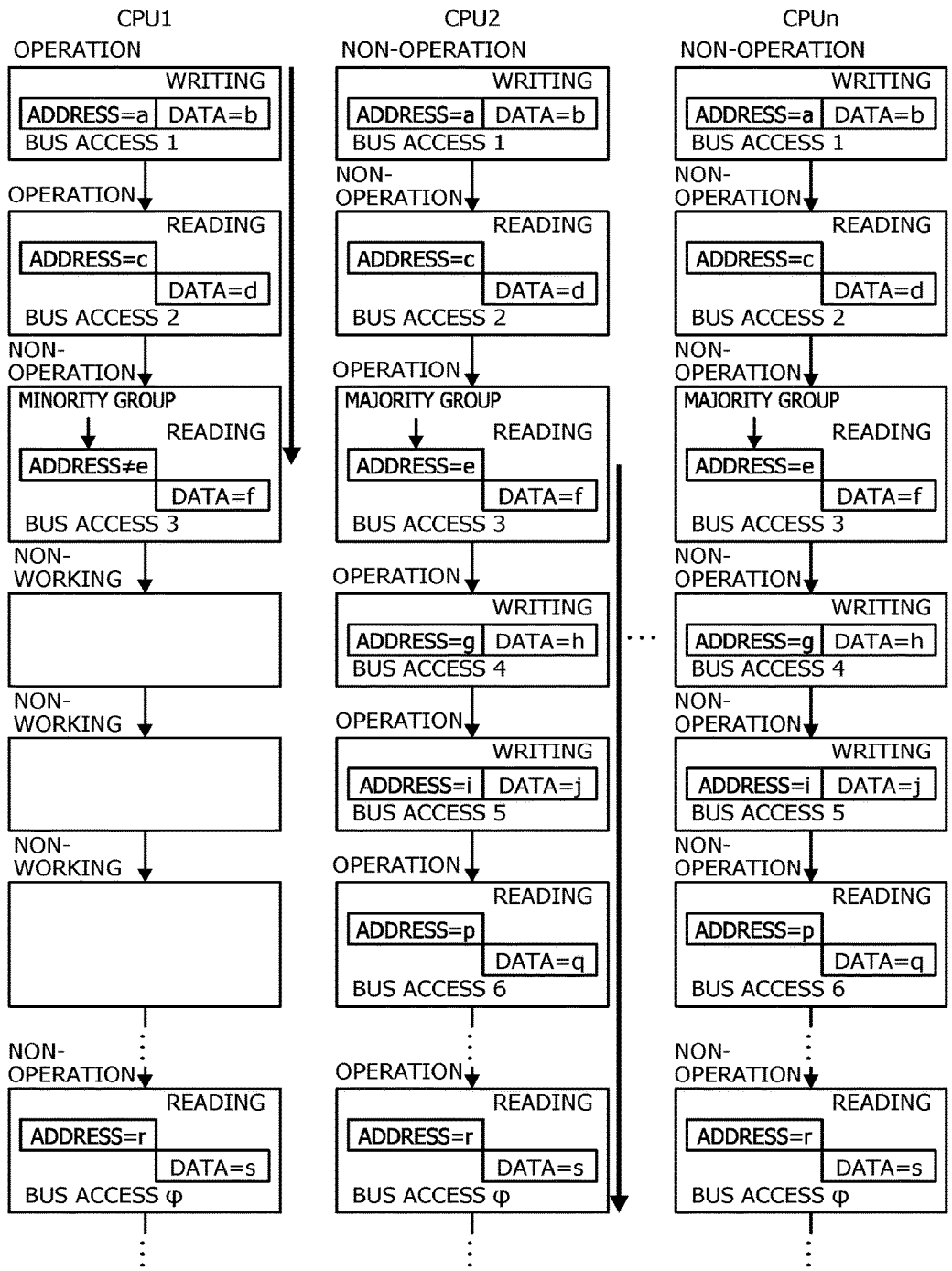
FIG. 4 is another diagram for describing the operation of the working CPUs and how to switch the operation CPU.

FIG. 4 illustrates an exemplary operation when any failure occurs in the CPU 1, which is the operation CPU, in the phase of the bus access 3. In the example in FIG. 4, it is assumed that the address of the CPU 1 is not "e" but the addresses of the CPUs other than the CPU 1 are "e". In such a case, it is determined that any failure occurs in the CPU 1 through the majority decision. Here, the CPU 1 is switched from the operation CPU to the non-working CPU and the CPU 2 is switched from the working CPU to the operation CPU. The CPU 1 returns to the non-operation CPU from the phase of the bus access ϕ, for example, after the failure is cleared.

An exemplary operation of the information processing apparatus 1 will be described in detail with reference to FIG. 5 to FIG. 14. First, a process performed by the address comparer 1631 will be described with reference to a flowchart illustrated in FIG. 5. This process is performed, for example, each time a certain time elapses after the operation CPU started the operation. Alternatively, this process may be continuously performed until the operation CPU stops the operation after the operation CPU started the operation.

Figure 5:
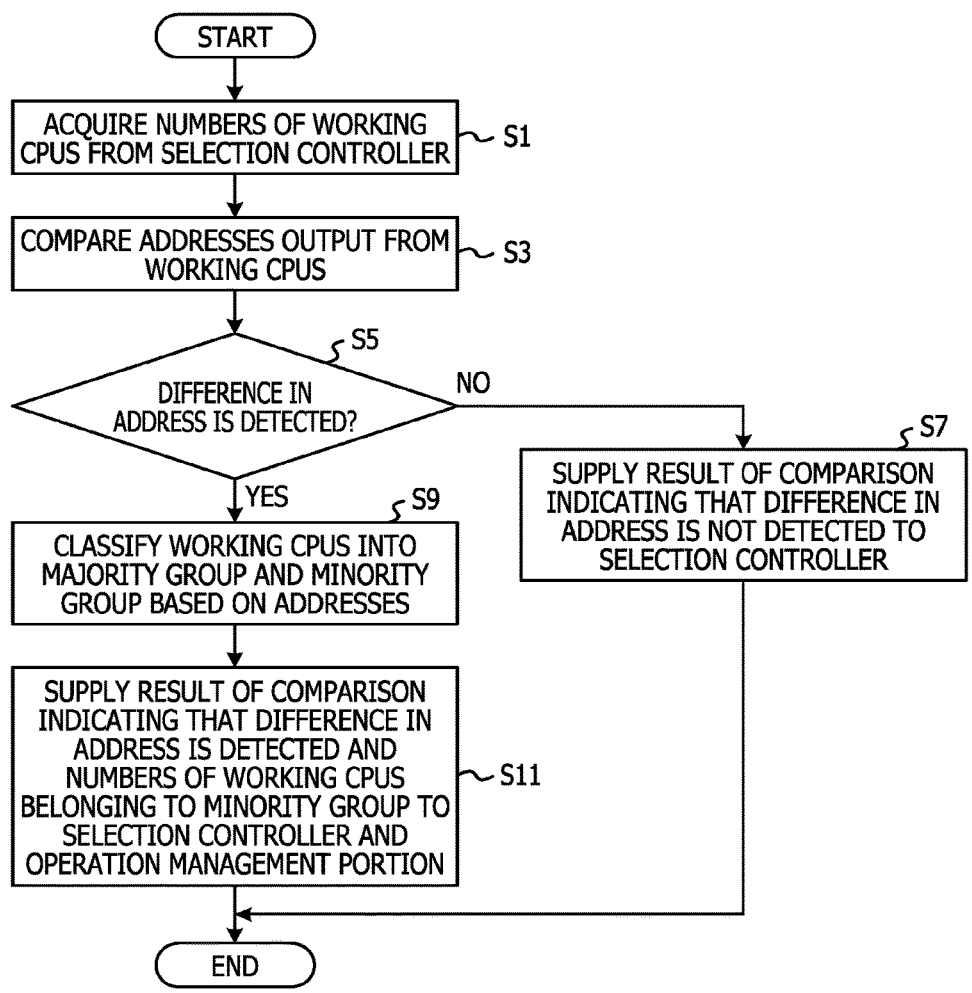
FIG. 5 is a flowchart illustrating a process performed by an address comparer.

Referring to FIG. 5, in S1, the address comparer 1631 acquires the numbers of the working CPUs (that is, the CPUs to be subjected to the majority decision) from the selection controller 1633.

In S3, the address comparer 1631 compares the addresses supplied from the working CPUs with each other. Specifically, the address comparer 1631 compares the addresses acquired from the storages connected to the working CPUs, among the storages a1 to an, with each other.

In S5, the address comparer 1631 determines whether a difference in address is detected (that is, all the addresses are not equal to each other). For example, the address comparer 1631 determines that a difference in address is detected if the addresses supplied from the working CPUs are an address "g", an address "g", and an address "gg". The address comparer 1631 determines that a difference in address is not detected if the addresses supplied from the working CPUs are an address "g", an address "g", and an address "g".

If the address comparer 1631 determines that a difference in address is not detected (NO in S5), in S7, the address comparer 1631 supplies the result of comparison indicating that a difference in address is not detected to the selection controller 1633. Then, the process illustrated in FIG. 5 is terminated.

If the address comparer 1631 determines that a difference in address is detected (YES in S5), in S9, the address comparer 1631 classifies the working CPUs into a majority group and a minority group based on the addresses of the working CPUs. For example, it is assumed that the address of the CPU 1 is "g", the address of the CPU 2 is "g", the address of the CPU 3 is "g", the address of the CPU 4 is "gg", and the address of the CPU 5 is "gg". In such a case, the CPU 1 to the CPU 3 are the working CPUs belonging to the majority group and the CPU 4 and the CPU 5 are the working CPUs belonging to the minority group.

In S11, the address comparer 1631 supplies the result of comparison indicating that a difference in address is detected and the numbers of the working CPUs belonging to the minority group to the selection controller 1633 and the operation management portion 162. Then, the process illustrated in FIG. 5 is terminated.

The above process allows the CPUs having the probability of an abnormal operation (the working CPUs belonging to the minority group) to be detected. Since the addresses are output from the CPUs in both the reading and the writing, the majority decision is capable of being performed in both the reading and the writing.

Next, a process performed by the data value comparer 1632 will be described with reference to a flowchart illustrated in FIG. 6. This process is performed, for example, each time a certain time elapses after the operation CPU started the operation. Alternatively, this process may be continuously performed until the operation CPU stops the operation after the operation CPU started the operation.

Figure 6:
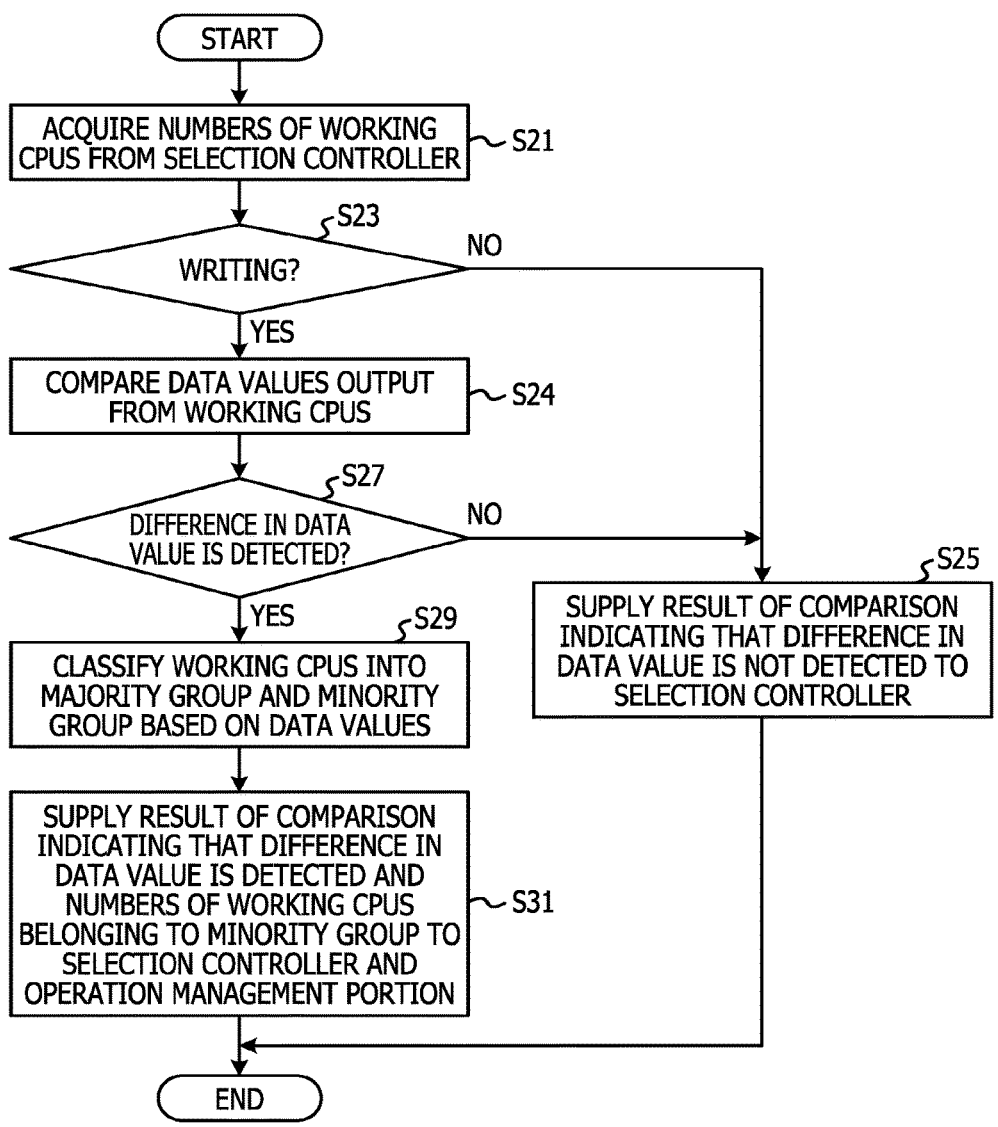
FIG. 6 is a flowchart illustrating a process performed by a data value comparer.

Referring to FIG. 6, in S21, the data value comparer 1632 acquires the numbers of the working CPUs (that is, the CPUs to be subjected to the majority decision) from the selection controller 1633.

In S23, the data value comparer 1632 determines whether the bus access corresponds to writing. Whether the bus access corresponds to writing may be based on the content of the data values or the state of a writing control signal in each CPU. Since the data values in the reading are not output from the CPUs, the comparison is performed only when the bus access corresponds to writing in the first embodiment. If the data value comparer 1632 determines that the bus access corresponds to reading (NO in S23), the process goes to S25.

If the data value comparer 1632 determines that the bus access corresponds to writing (YES in S23), in S24, the data value comparer 1632 compares the data values supplied from the working CPUs with each other. Specifically, the data value comparer 1632 compares the data values acquired from the storages connected to the working CPUs, among the storages b1 to bn, with each other.

In S27, the data value comparer 1632 determines whether a difference in data value is detected (that is, all the data values are not equal to each other). For example, the data value comparer 1632 determines that a difference in data value is detected if the data values supplied from the working CPUs are a data value "h", a data value "h", and a data value "hh". The data value comparer 1632 determines that a difference in data value is not detected if the data values supplied from the working CPUs are a data value "h", a data value "h", and a data value "h".

If the data value comparer 1632 determines that a difference in data value is not detected (NO in Step 27), in S25, the data value comparer 1632 supplies the result of comparison indicating that a difference in data value is not detected to the selection controller 1633. Then, the process illustrated in FIG. 6 is terminated.

If the data value comparer 1632 determines that a difference in data value is detected (YES in S27), in S29, the data value comparer 1632 classifies the working CPUs into the majority group and the minority group based on the data values. For example, it is assumed that the data value of the CPU 1 is "h", the data value of the CPU 2 is "h", the data value of the CPU 3 is "h", the data value of the CPU 4 is "h", and the data value of the CPU 5 is "hh". In such a case, the CPU 1 to the CPU 4 are the working CPUs belonging to the majority group and the CPU 5 is the working CPU belonging to the minority group.

In S31, the data value comparer 1632 supplies the result of comparison indicating that a difference in data value is detected and the numbers of the working CPUs belonging to the minority group to the selection controller 1633 and the operation management portion 162. Then, the process illustrated in FIG. 6 is terminated.

The above process allows the CPU having the probability of an abnormal operation (the working CPU belonging to the minority group) to be detected.

Next, a process performed by the selection controller 1633 will be described with reference to flowcharts illustrated in FIG. 7 and FIG. 8. This process is performed, for example, each time a certain time elapses after the operation CPU started the operation. Alternatively, this process may be continuously performed until the operation CPU stops the operation after the operation CPU started the operation.

Figure 7:
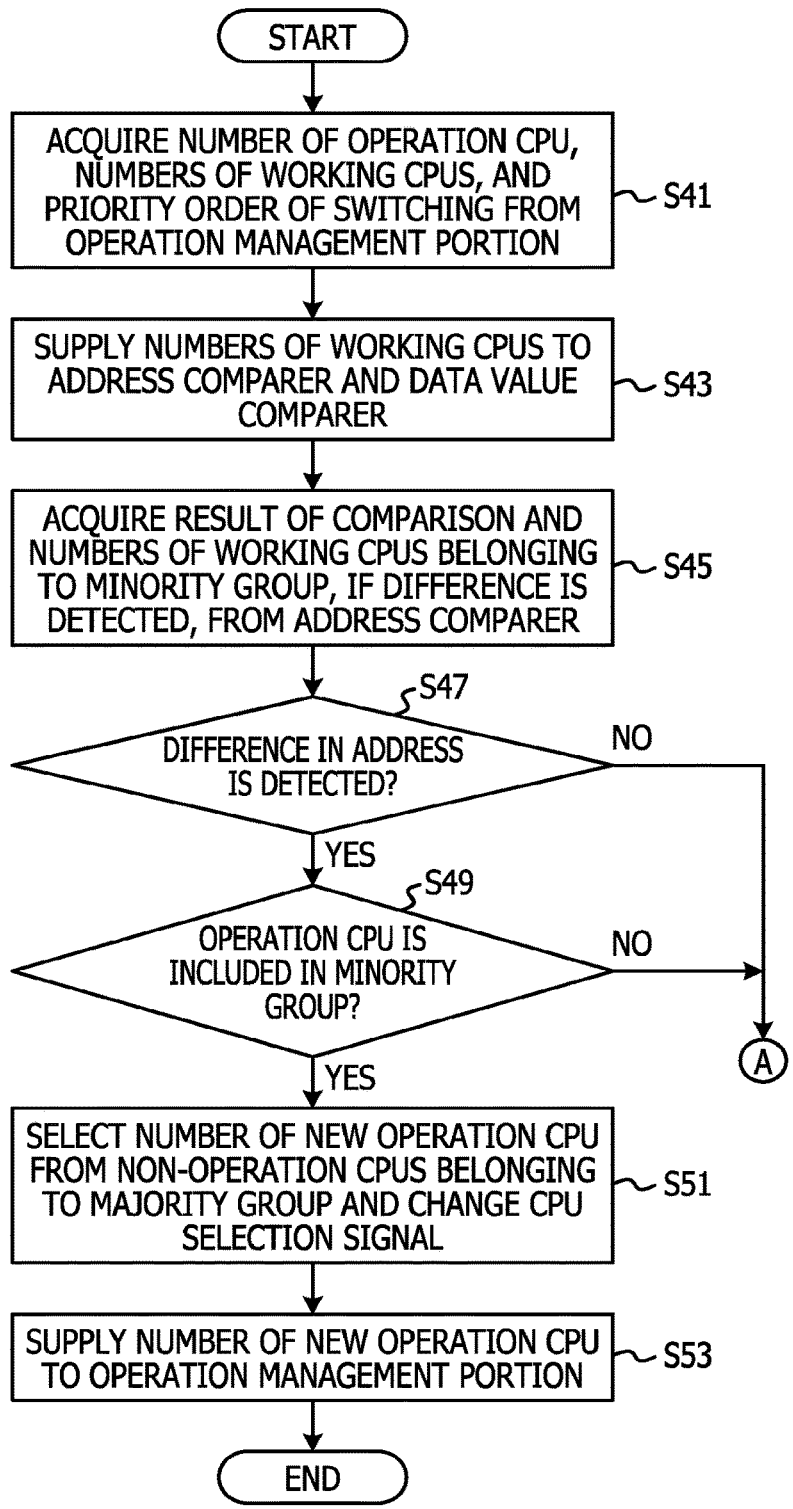
FIG. 7 is a flowchart illustrating a process performed by a selection controller.

Referring to FIG. 7, in S41, the selection controller 1633 acquires the number of the operation CPU, the numbers of the working CPUs, and the priority of switching from the operation management portion 162.

In S43, the selection controller 1633 supplies the numbers of the working CPUs acquired in S41 (that is, the numbers of the CPUs to be subjected to the majority decision) to the address comparer 1631 and the data value comparer 1632.

In S45, the selection controller 1633 acquires the result of the comparison and the numbers of the working CPUs belonging to the minority group, if a difference in address is detected in S5, from the address comparer 1631.

In S47, the selection controller 1633 determines whether the result of the comparison acquired in S45 indicates that a difference in address is detected. If the result of the comparison acquired in S45 does not indicate that a difference in address is detected (NO in S47), the process goes to S55 in FIG. 8 through an arrow A.

If the result of the comparison acquired in S45 indicates that a difference in address is detected (YES in S47), in S49, the selection controller 1633 determines whether the operation CPU is included in the minority group. The selection controller 1633 determines in S49 whether the number of the operation CPU is included in the numbers of the working CPUs acquired in S45.

Figure 8:
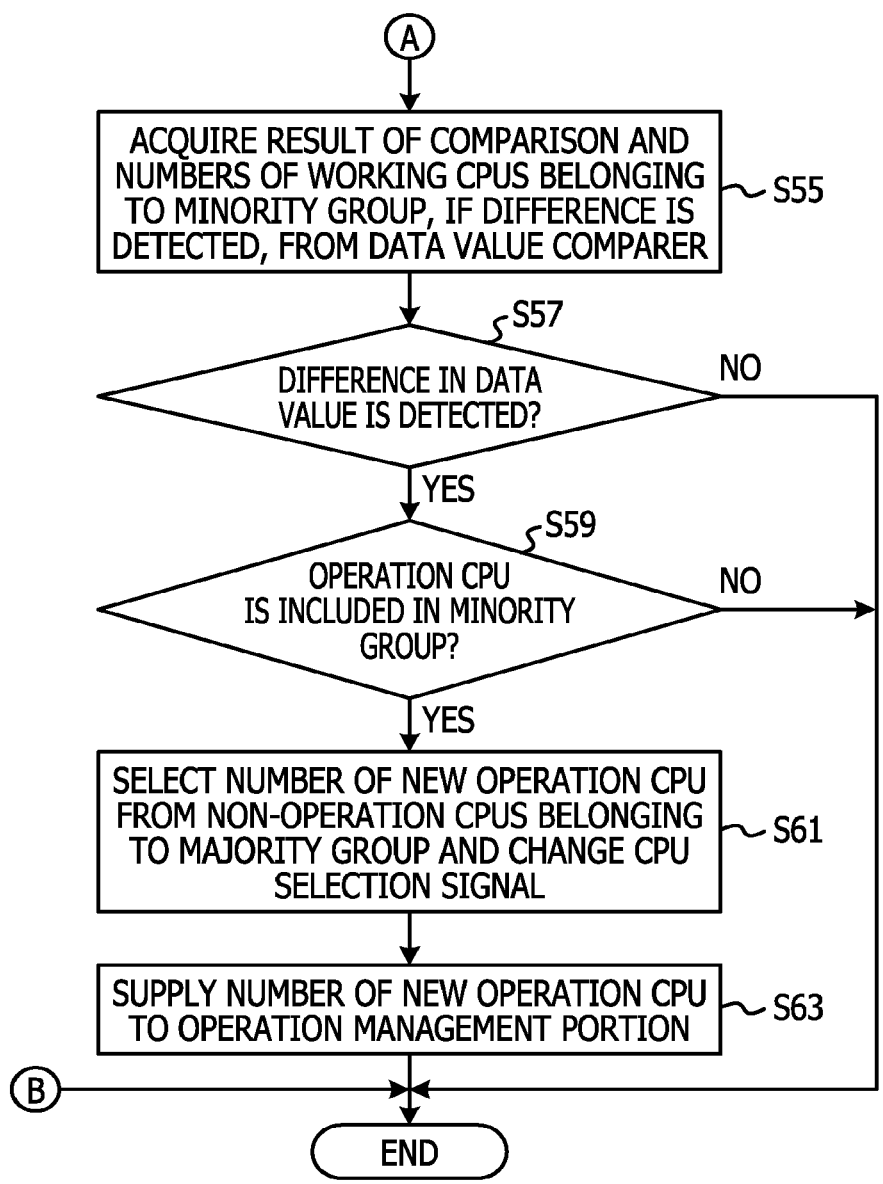
FIG. 8 is a flowchart illustrating the process performed by the selection controller.

If the operation CPU is not included in the minority group (NO in S49), the process goes to S55 in FIG. 8 through the arrow A. If the operation CPU is included the minority group (YES in S49), in S51, the selection controller 1633 selects the number of a new operation CPU (that is, a CPU to be switched to the operation CPU) from the non-operation CPUs belonging to the majority group (that is, the CPUs other than the CPUs belonging to the minority group, among the working CPUs) and changes the CPU selection signal. The CPU selection signal is changed so that the new operation CPU is connected to the working data storage unit 11, the sensor data storage unit 12, and the operation data storage unit 13 in S51 and the selector block 15 performs the switching of the bus in accordance with the CPU selection signal. The operation CPU is selected in S51 based on the priority of switching acquired in S41.

In S53, the selection controller 1633 supplies the number of the new operation CPU to the operation management portion 162. Then, the process illustrated in FIG. 7 and FIG. 8 is terminated through an arrow B.

Referring to FIG. 8, in S55, the selection controller 1633 acquires the result of the comparison and the numbers of the working CPUs belonging to the minority group, if a difference in data value is detected in S27, from the data value comparer 1632.

In S57, the selection controller 1633 determines whether the result of the comparison acquired in S55 indicates that a difference in data value is detected. If the result of the comparison acquired in S55 does not indicate that a difference in data value is detected (NO in S57), the process illustrated in FIG. 7 and FIG. 8 is terminated.

If the result of the comparison acquired in S55 indicates that a difference in data value is detected (YES in S57), in S59, the selection controller 1633 determines whether the operation CPU is included in the minority group. The selection controller 1633 determines in S59 whether the number of the operation CPU is included in the numbers of the working CPUs acquired in S55.

If the operation CPU is not included in the minority group (NO in S59), the process illustrated in FIG. 7 and FIG. 8 is terminated. If the operation CPU is included in the minority group (YES in S59), in S61, the selection controller 1633 selects the number of a new operation CPU (that is, a CPU to be switched to the operation CPU) from the non-operation CPUs belonging to the majority group (that is, the CPUs other than the CPUs belonging to the minority group, among the working CPUs) and changes the CPU selection signal. The CPU selection signal is changed so that the new operation CPU is connected to the working data storage unit 11, the sensor data storage unit 12, and the operation data storage unit 13 in S61 and the selector block 15 performs the switching of the bus in accordance with the CPU selection signal. The operation CPU is selected in S61 based on the priority of switching acquired in S41.

In S63, the selection controller 1633 supplies the number of the new operation CPU to the operation management portion 162. Then, the process illustrated in FIG. 7 and FIG. 8 is terminated.

With the above process, it is possible to suppress wrong control caused by any failure of the CPU. In addition, since the new operation CPU is selected from the non-operation CPUs, which are the working, it is possible to continue the operation while the switching time is greatly reduced.

Next, a process performed by the operation management portion 162 will be described with reference to flowcharts illustrated in FIG. 9 and FIG. 12. This process is performed, for example, after power-on.

Figure 9:
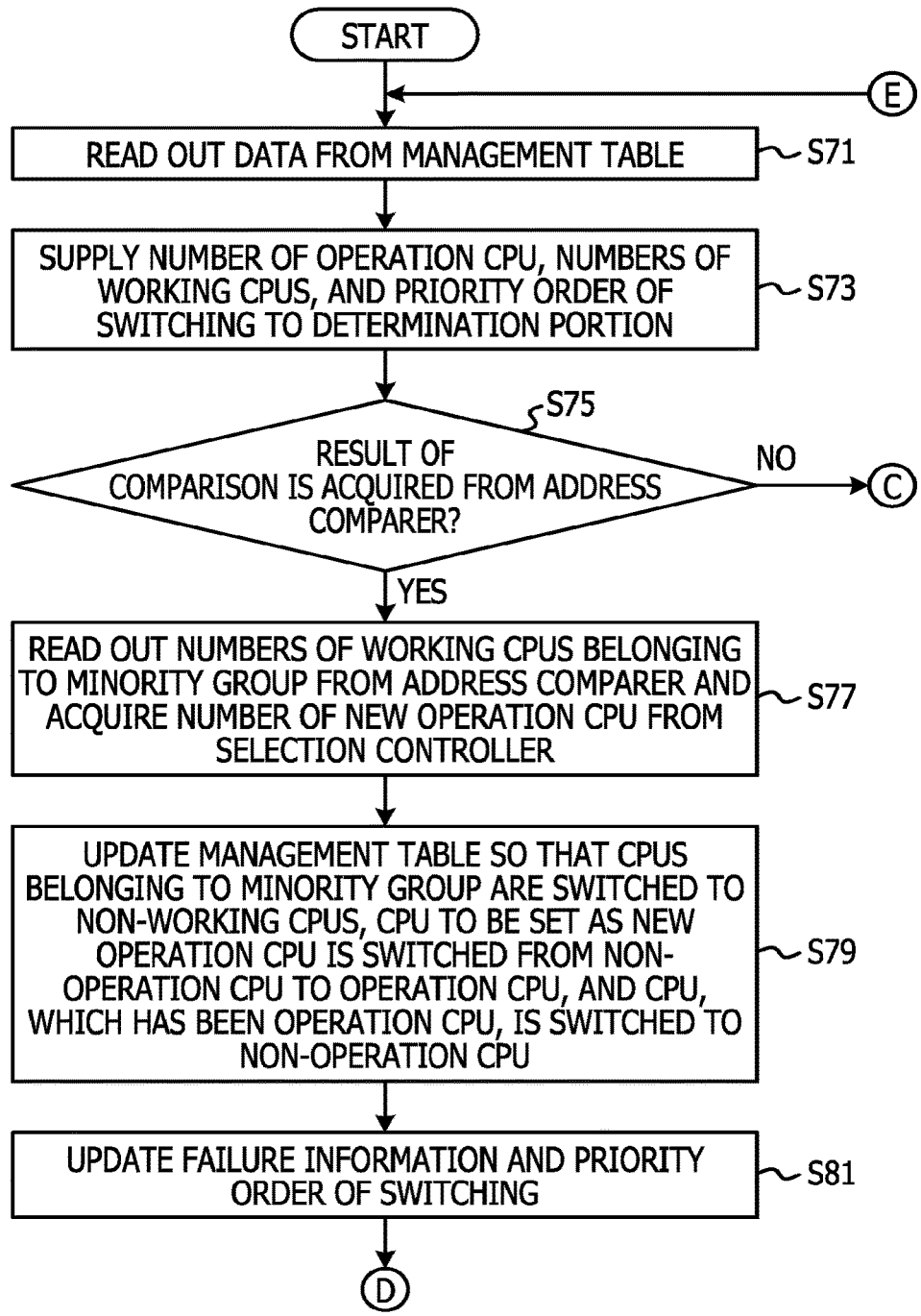
FIG. 9 is a flowchart illustrating a process performed by an operation management portion.

Referring to FIG. 9, in S71, the operation management portion 162 reads out data from a management table stored in the management table storage portion 164.

FIG. 10 illustrates an exemplary management table stored in the management table storage portion 164. In the example illustrated in FIG. 10, the number of each CPU, information indicating whether the CPU is the operation CPU (hereinafter referred to as operation information), information indicating whether the CPU is the working CPU (hereinafter referred to as working information), information indicating whether a failure occurs in the CPU (hereinafter referred to as failure information), and information indicating the priority order of switching are stored in the management table. The CPU is the operation CPU when the operation information has a value of one ("1") and the CPU is the non-operation CPU when the operation information has a value of zero ("0"). The CPU is the working CPU when the working information has a value of one "1" and the CPU is the non-working CPU when the working information has a value of zero ("0"). The CPU is in failure when the failure information has a value of one ("1") and the CPU is not in failure when the failure information has a value of zero ("0"). The CPU is not the target of switching when the priority order of switching is zero "0". For example, since the current operation CPU is not switched to the operation CPU next, the priority order of switching of the current operation CPU is zero ("0").

FIG. 11 illustrates an exemplary management table when the CPU 1 fails and the operation CPU is switched from the CPU 1 to the CPU 2. In the example illustrated in FIG. 11, the operation information about the CPU 1 is switched from "1" to "0" and the failure information about the CPU 1 is switched from "0" to "1". Since the CPU 1 is stopped because of the failure, the working information about the CPU 1 is switched from "1" to "0". The operation information about the CPU 2 is switched from "0" to "1". In addition, since the number of the working CPUs is decreased due to the failure of the CPU 1, the CPU 4 is switched to the working CPU. Accordingly, the working information about the CPU 4 is switched from "0" to "1". The priority order of switching is also updated.

Referring back to FIG. 9, in S73, the operation management portion 162 supplies the number of the operation CPU, the numbers of the working CPUs, and the priority order of switching to the determination portion 163.

In S75, the operation management portion 162 determines whether the result of comparison indicating that a difference in address is detected is acquired from the address comparer 1631. If the result of comparison indicating that a difference in address is detected is not acquired from the address comparer 1631 (NO in S75), the process goes to S87 in FIG. 12 through an arrow C.

If the result of comparison indicating that a difference in address is detected is acquired from the address comparer 1631 (YES in S75), in S77, the operation management portion 162 reads out the numbers of the working CPUs belonging to the minority group, acquired from the address comparer 1631, and acquires the number of the new operation CPU from the selection controller 1633. The numbers of the working CPUs read out in S77 are acquired with the result of the comparison and are stored in a certain storage unit (for example, a main memory or a register).

In S79, the operation management portion 162 updates the management table so that the CPUs belonging the minority group are switched to the non-working CPUs (that is, the working information is set to "0"), the CPU to be set as the new operation CPU is switched from the non-operation CPU to the operation CPU (that is, the operation information is set to "1), and the CPU, which has been the operation CPU, is switched to the non-operation CPU (that is, the operation information is set to "0"). When the CPU, which has been the operation CPU, belongs to the minority group, the CPU is switched to the non-working CPU. The operation management portion 162 supplies the information on the operation status and the information on the working status to the synchronization control portion 161 and, in response to the received information, the synchronization control portion 161 controls the operation timing and working of the CPU 1 to CPU n.

In S81, the operation management portion 162 updates the failure information and the priority order of switching stored in the management table. Specifically, the operation management portion 162 sets the failure information about the CPUs belonging to the minority group is set to "1" and the priority orders of the CPUs belonging to the minority group are set to "0". Then, the process goes to S83 in FIG. 12 through an arrow D.

Figure 12:
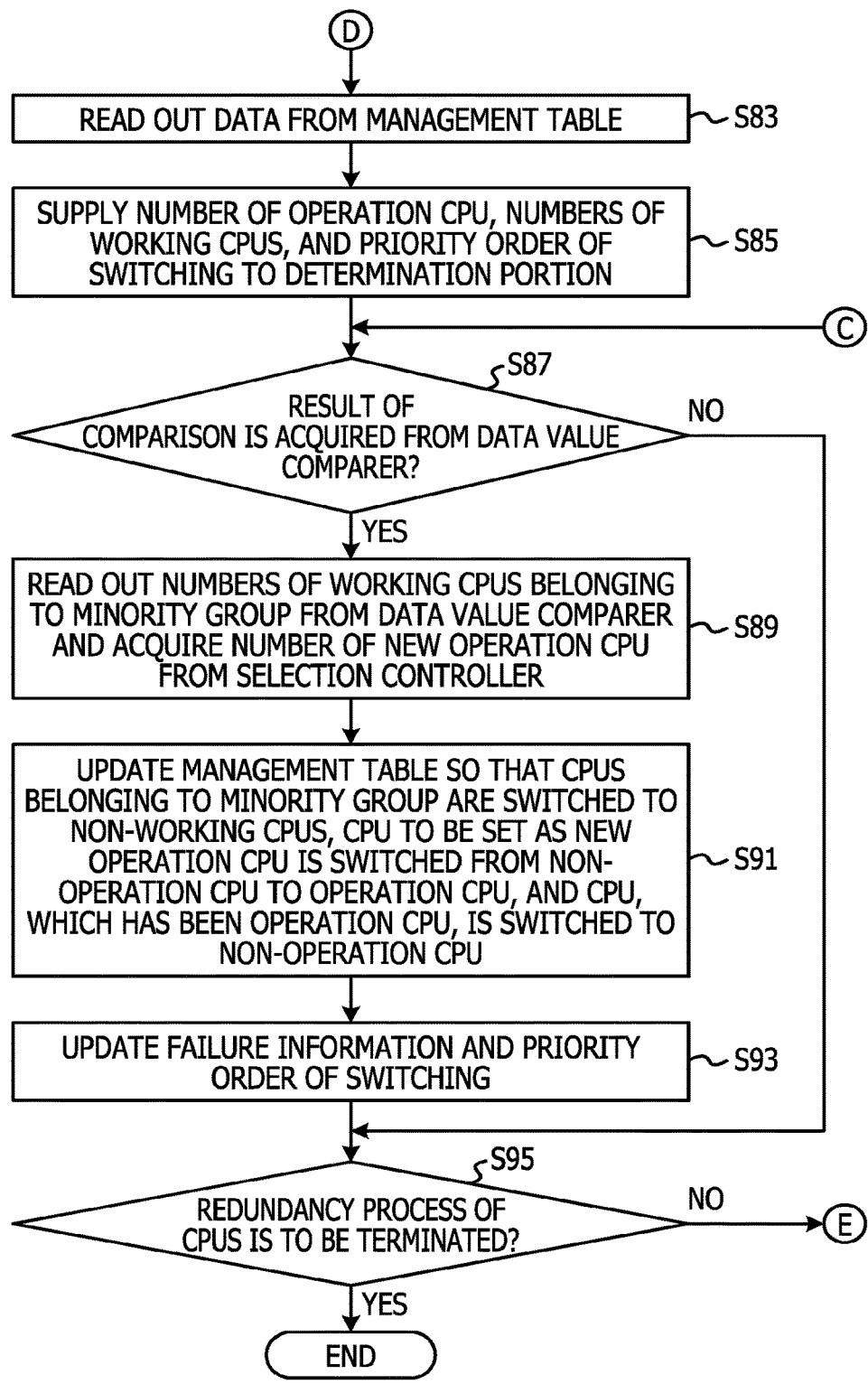
FIG. 12 is a flowchart illustrating the process performed by the operation management portion.

Referring to FIG. 12, in S83, the operation management portion 162 reads out data from the management table stored in the management table storage portion 164.

In S85, the operation management portion 162 supplies the number of the operation CPU, the numbers of the working CPUs, and the priority order of switching to the determination portion 163.

In S87, the operation management portion 162 determines whether the result of comparison indicating that a difference in data value is detected is acquired from the data value comparer 1632. If the result of comparison indicating that a difference in data value is detected is not acquired from the data value comparer 1632 (NO in S87), the process goes to S95.

If the result of comparison indicating that a difference in data value is detected is acquired from the data value comparer 1632 (YES in S87), in S89, the operation management portion 162 reads out the numbers of the working CPUs belonging to the minority group, acquired from the data value comparer 1632, and acquires the number of the new operation CPU from the selection controller 1633. The numbers of the working CPUs read out in S89 are acquired with the result of the comparison and are stored in a certain storage unit (for example, the main memory or the register).

In S91, the operation management portion 162 updates the management table so that the CPUs belonging the minority group are switched to the non-working CPUs (that is, the working information is set to "0"), the CPU to be set as the new operation CPU is switched from the non-operation CPU to the operation CPU (that is, the operation information is set to "1), and the CPU, which has been the operation CPU, is switched to the non-operation CPU (that is, the operation information is set to "0"). When the CPU, which has been the operation CPU, belongs to the minority group, the CPU is switched to the non-working CPU. The operation management portion 162 supplies the information on the operation status and the information on the working status to the synchronization control portion 161 and, in response to the received information, the synchronization control portion 161 controls the operation timing and working of the CPU 1 to CPU n.

In S93, the operation management portion 162 updates the failure information and the priority order of switching stored in the management table. Specifically, the operation management portion 162 sets the failure information about the CPUs belonging to the minority group to "1" and sets the priority orders of the CPUs belonging to the minority group to "0".

In S95, the operation management portion 162 determines whether the redundancy process of the CPUs is to be terminated. If the redundancy process of the CPUs is not to be terminated (NO in S95), the process goes back to S71 in FIG. 9 through an arrow E. If the redundancy process of the CPUs is to be terminated (YES in S95), the process illustrated in FIG. 9 and FIG. 12 is terminated.

With the above process, it is possible to appropriately manage the operation status and the working status of the CPU 1 to CPU n.

Figure 13:
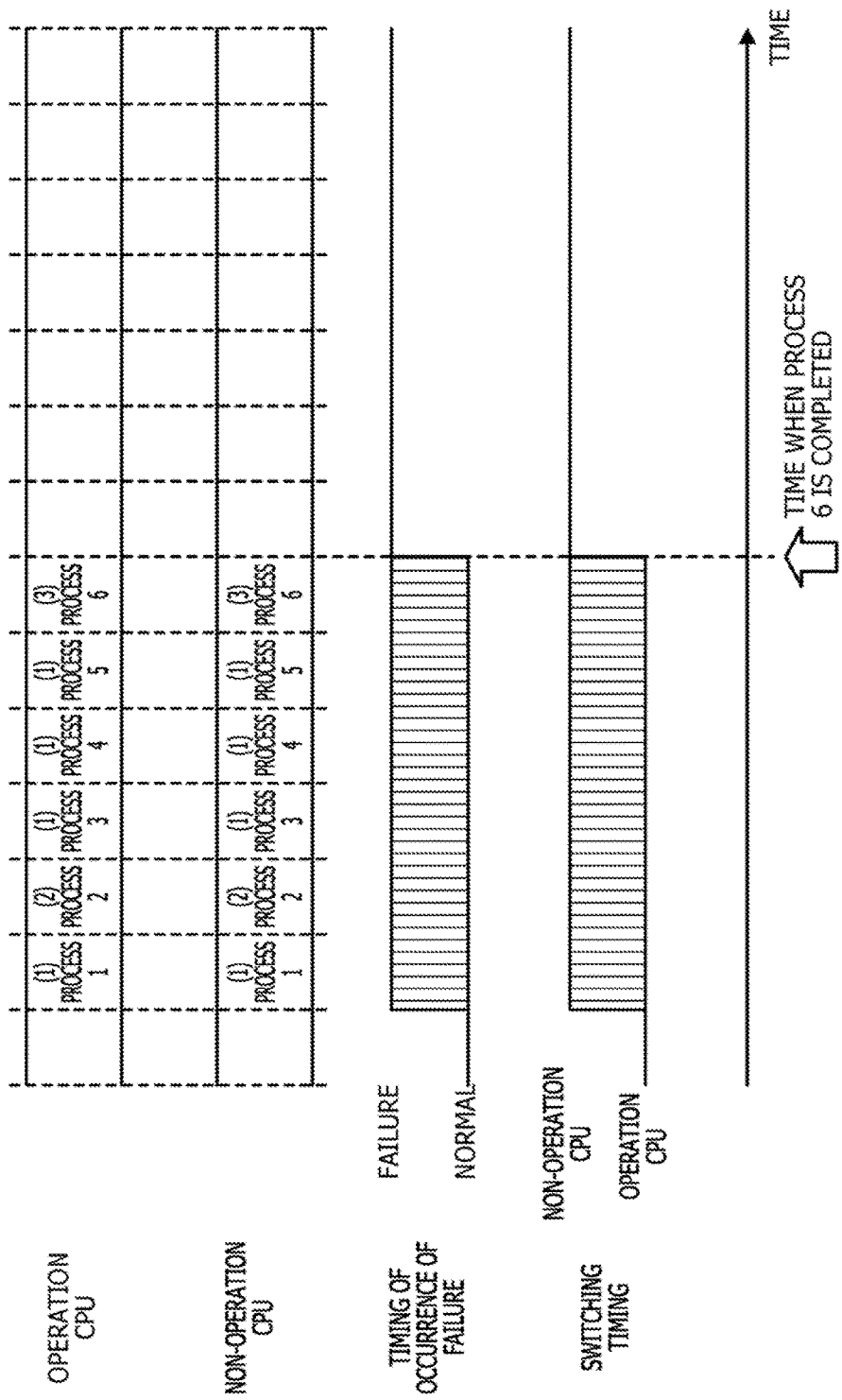
FIG. 13 is a diagram for describing a switching time of the operation CPU.

The switching time of the operation CPU will now be described with reference to FIG. 13 and FIG. 14. Processes performed by the operation CPU, processes performed by the non-operation CPU, the timing when a failure occurs in the operation CPU, and the timing of switching between the CPUs are illustrated in FIG. 13 and FIG. 14. The horizontal axis represents time in FIG. 13 and FIG. 14. Referring to FIG. 13 and FIG. 14, (1) indicates that the processes are related to the working data storage unit 11, (2) indicates that the processes are related to the sensor data storage unit 12, (3) indicates that the processes are related to the operation data storage unit 13, and (4) indicates communication between the CPUs. Each process is performed in a time corresponding to one clock.

FIG. 13 illustrates an example when a method of the first embodiment is used. In the example illustrated in FIG. 13, a failure of the operation CPU and switching of the CPUs occur at any timing in rectangular portions in which vertical lines are drawn. In the first embodiment, the operation CPU and the non-operation CPU concurrently perform the same processes in parallel. Specifically, a process 1 to read out an instruction to read out the sensor data from the sensor data storage unit 12 from the working data storage unit 11, a process 2 to read out the sensor data from the sensor data storage unit 12 in response to the instruction that is read out, a process 3 to read out a data processing instruction from the working data storage unit 11, a process 4 to process the data stored in the working data storage unit 11 in response to the data processing instruction that is read out, a process 5 to read out a writing instruction from the working data storage unit 11, and a process 6 to perform writing into the operation data storage unit 13 in response to the writing instruction that is read out are performed in parallel. The communication between the CPUs does not occur in the example in FIG. 13. Accordingly, there is no time period when the operation is stopped even if the operation CPU is switched at any timing in the rectangular portions in which the vertical lines are drawn.

FIG. 14 illustrates an example when the method of the first embodiment is not used. In the example illustrated in FIG. 14, a failure of the operation CPU occurs at any timing in rectangular portions in which vertical lines are drawn. Upon detection of the failure, equalization is performed (that is, the CPUs are set to the same state) in order to switch the CPUs. Specifically, the operation CPU performs a process U to read out an instruction to transmit equalization data for equalizing the non-operation CPUs from the working data storage unit 11 and a process V to transmit the equalization data to the non-operation CPUs. The non-operation CPU performs a process W to receive the equalization data from the operation CPU, a process X to read out an instruction to confirm the validity of the equalization data from the working data storage unit 11, and a process Y to confirm the validity of the equalization data in accordance with the instruction that is read out. At this time, the operation CPU is switched and the new operation CPU starts the process 3 to read out the data processing instruction from the working data storage unit 11. As described above, with the method of detecting an occurrence of a failure and then performing the equalization, the switching is not performed instantaneously. No new process is performed before the new operation CPU completes the process 6 to perform the writing into the operation data storage unit 13 since the original operation CPU has completed the process 6 to perform the writing into the operation data storage unit 13. Accordingly, the processes are substantially delayed. Since it takes a time corresponding to several clocks normally to perform each process, the delay time is further increased practically.

Other Embodiments

The CPUs belonging to the minority group are switched to the non-working CPUs (that is, are stopped) in the first embodiment. However, addresses or the likes different from the addresses or the likes of the majority group may be detected because of a temporary bus error caused by noise even if no failure occurs in the hardware itself of the CPUs.

Accordingly, the CPU for which a difference in address or data value is detected may be switched to the non-operation CPU first without immediately being stopped. The CPU may continue the operation as the non-operation CPU when the CPU continuously belongs to the majority group a certain number of times or more before the bus access is performed for a certain time or a certain number of times. The CPU may be stopped when the CPU does not belong to the majority group before the bus access is performed for a certain time or a certain number of times.

While the present disclosure is described in terms of some specific examples and embodiments, it will be clear that the present disclosure is not limited to these specific examples and embodiments. For example, the functional block configuration of the information processing apparatus 1 described above may not coincide with the practical program module configuration.

The structure of each table described above is only an example and each table is not limited to the above structure. In addition, the order of the steps may be switched in the process flows as long as the results of the processes are not changed. The steps may be performed in parallel.

Although the examples using the multiple CPU 1 to CPU n are described above, the embodiments are applicable to multiple CPU cores.

When it is difficult for the operation CPU and the non-operation CPUs to concurrently perform the processes in parallel due to a restriction on hardware, the non-operation CPUs may perform the same processes behind the processes of the operation CPU by a time α. Here, α is a time resulting from multiplication of the time corresponding to one clock by an integer that is not smaller than zero.

For example, when the number of CPUs having a data value "g" is two and the number of CPUs having a data value "f" is two, it is not possible to determine the majority group and the minority group through the majority decision. In such a case, it may be considered that the difference in data value is not detected.

Although the information acquiring side actively acquire information from the information providing side in the above examples, the information providing side may provide information to the information acquiring side at certain timing. Specifically, the timing when the address comparer 1631, the data value comparer 1632, the selection controller 1633, and the operation management portion 162 acquire information may be arbitrarily set and is not limited to the above ones.

In selection of the operation CPU, the CPU in which no failure has occurred may be selected as the operation CPU based on the history of the majority decision.

When the switching of the operation CPU has been performed, data notifying the manager of the information processing apparatus 1 of the switching of the operation CPU may be output.

The summary of the above embodiments is as follows:

The method of extracting the normal processor according to the embodiments includes (A) a process to cause the multiple processors to perform the same process and (B), if operational information that differs between the processors is included in the operational information in the process performed by each processor, a process to extract one or more processors for which the operational information belonging to the majority group is acquired as the normal processor.

With the above method, it is possible to extract the normal processor from the multiple processors. In addition, since the multiple processors perform the same processes and the equalization process is not performed, the switching of the processors is performed at high speed.

The operational information described above may include at least one of the writing address of data, the value of data to be written, the reading address of data, and the value of data that is read out in the process performed by each processor.

The above extracting method may further include (C) a process to acquire the operational information by capturing data passing through the bus connected to each of the multiple processors. With this method, the operational information is easily acquired.

The above extracting method may further include (D) if a predetermined first processor (for example, the operation CPU in the embodiments), among the multiple processors, is not included in the one or more processors for which the operational information belonging to the majority group is acquired, a process to select a new first processor from the one or more processors for which the operational information belonging to the majority group is acquired. With the above method, it is possible to address a case in which the first processor may fail.

In (A) the process to cause the multiple processors to perform the same process, (a1) the processes performed by the processors other than the first processor, among the multiple processors, may be behind the process performed by the first processor by a certain time. For example, there is a case in which it is difficult to cause the first processor and the processors other than the first processors to perform the same process due to a restriction on hardware. With the above process, it is possible to address such a case.

The above extracting method may further include (E) if the operational information belonging to the majority group is not acquired for a certain time or more or a certain number of times or more for a processor other than the one or more processors for which the operational information belonging to the majority group is acquired, a process to stop the processor. When the operational information belonging to the majority group is not acquired for a certain time or more or a certain number of times or more, the processor may fail. Accordingly, with the above method, it is possible to exclude the processor that may fail from the target processors.

The above extracting method may further include (F) a process to perform bus connection to switch the predetermined first processor to a new first processor. With the above method, it is possible to suppress an occurrence of a state in which the first processor fails.

In (D) the process to select a new first processor, (d1) a new first processor may be selected from the one or more processors for which the operational information belonging to the majority group is acquired based on priority order. With this process, it is possible to select an appropriate first processor.

Programs to cause the processors to perform the processes in the above methods may be created. The programs are stored in a computer-readable storage medium or storage unit, such as a flexible disk, a compact disk-read only memory (CD-ROM), a magneto-optical disk, a semiconductor memory, or a hard disk. An intermediate processing result is temporarily stored in a storage unit, such as the main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method executed by a computer, the method comprising:

causing a first processor and each processor of a processor group to perform a process, the first processor being set as an operation processor;

comparing first operational information with each operational information generated by each processor of the processor group in the process, the first operational information generated by the first processor in the process;

when the first operational information is different from second operational information generated by each of a first plurality of processors of the processor group in the process, setting one of the first plurality of processors as the operation processor instead of the first processor;

adding the first processor to the processor group;

controlling the one of the first plurality of processors to output a result of the process; and after the adding, when a number of times that the first processor generates operational information different from third operational information generated by each of a second plurality of processors of the processor group in other processes is no less than a value, excluding the first processor from the processor group.

2. The method according to claim 1, wherein the first operational information and the second operational information include at least one of a writing address of data, a value of data to be written, a reading address of data, and a value of data that is read out in the process.

3. The method according to claim 1, wherein the first operational information and the second operational information are acquired by capturing data transferred through a bus coupling to the first processor and each processor of the processor group.

4. The method according to claim 1, wherein in the causing, the process is performed by each processor of the processor group with a certain delay after a timing at which the first processor performs the process.

5. The method according to claim 1, wherein a second processor of the processor group is excluded from the processor group when a period or a number of times that the second processor generates operational information different from operational information generated by each of the first plurality of processors in processes is no less than a certain period or a certain value.

6. The method according to claim 1, further comprising:
switching bus connection from the first processor to each processor of the processor group when the setting is executed.

7. The method according to claim 1, wherein the one of the first plurality of processors which is set as the operation processor is selected based on priority order assigned to each of the first plurality of processors.

8. An information processing apparatus, comprising:
control circuitry configured to
cause a first processor and each processor of a processor group to perform a process, the first processor being set as an operation processor;
compare first operational information with each operational information generated by each processor of the processor group in the process, the first operational information generated by the first processor in the process;
when the first operational information is different from second operational information generated by each of a first plurality of processors of the processor group in the process, set one of the first plurality of processors as the operation processor instead of the first processor;
add the first processor to the processor group;
control the one of the first plurality of processors to output a result of the process; and
after the first processor is added to the processor group, when a number of times that the first processor generates operational information different from third operational information generated by each of a second plurality of processors of the processor group in other processes is no less than a value, exclude the first processor from the processor group.

9. The information processing apparatus according to claim 8, wherein the first operational information and the second operational information include at least one of a writing address of data, a value of data to be written, a reading address of data, and a value of data that is read out in the process.

10. The information processing apparatus according to claim 8, wherein the first operational information and the second operational information are acquired by capturing data transferred through a bus coupling to the first processor and each processor of the processor group.

11. The information processing apparatus according to claim 8, wherein the process is performed by each processor of the processor group with a certain delay after a timing at which the first processor performs the process.

12. The information processing apparatus according to claim 8, wherein a second processor of the processor group is excluded from the processor group when a period or a number of times that the second processor generates operational information different from operational information generated by each of the first plurality of processors in processes is no less than a certain period or a certain value.

13. The information processing apparatus according to claim 8, wherein the control circuitry is configured to switch bus connection from the first processor to each processor of the processor group when the setting is executed.

14. The information processing apparatus according to claim 8, wherein the one of the first plurality of processors which is set as the operation processor is selected based on priority order assigned to each of the first plurality of processors.

15. A non-transitory computer readable medium having stored therein a program that causes a computer to execute a control process, the control process comprising:
causing a first processor and each processor of a processor group to perform a process, the first processor being set as an operation processor;
comparing first operational information with each operational information generated by each processor of the processor group in the process, the first operational information generated by the first processor in the process;
when the first operational information is different from second operational information generated by each of a first plurality of processors of the processor group in the process, setting one of the first plurality of processors as the operation processor instead of the first processor;
adding the first processor to the processor group;
controlling the one of the first plurality of processors to output a result of the process; and
after the adding, when a number of times that the first processor generates operational information different from third operational information generated by each of a second plurality of processors of the processor group in other processes is no less than a value, excluding the first processor from the processor group.

16. The non-transitory computer readable medium according to claim 15, wherein a second processor of the processor group is excluded from the processor group when a period or a number of times that the second processor generates operational information different from operational information generated by each of the first plurality of processors in processes is no less than a certain period or a certain value.

17. The non-transitory computer readable medium according to claim 15, wherein the control process further comprising:
switching bus connection from the first processor to each processor of the processor group when the setting is executed.

* * * * *